May 27, 1969    J. P. LAGERMASINI ET AL    3,446,408
APPARATUS FOR MANUFACTURING ARTICLES FROM A WEB OF MATERIAL
Filed Dec. 27, 1966

INVENTORS.
JOSEPH P. LAGERMASINI,
ROBERT R. LEUNIS,
GLENN H. ROBERTS
and LAURI D. TIALA BY David M. Keay

AGENT.

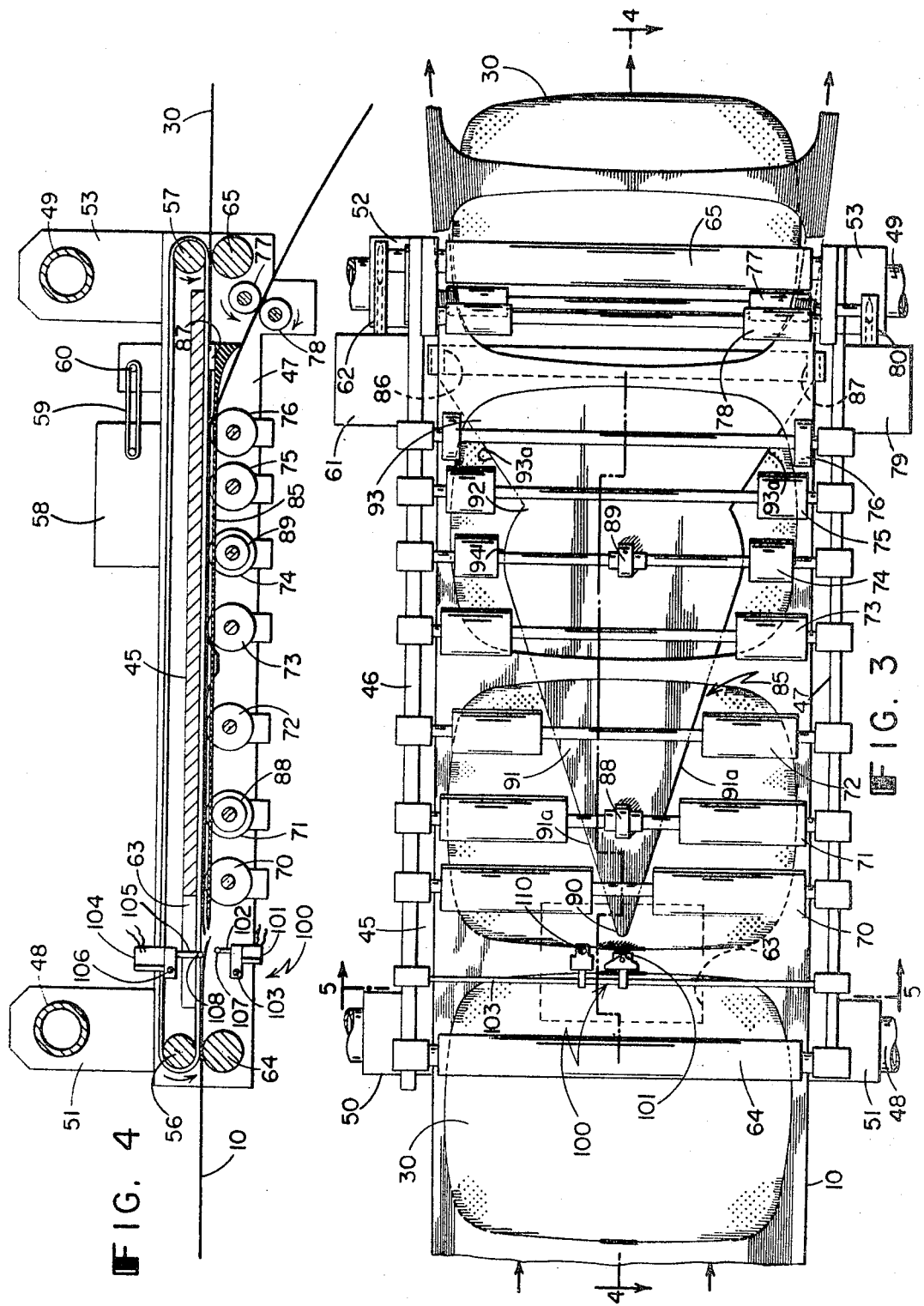

United States Patent Office 3,446,408
Patented May 27, 1969

3,446,408
APPARATUS FOR MANUFACTURING ARTICLES FROM A WEB OF MATERIAL
Joseph P. Lagermasini, Robert R. Leunis, Glenn H. Roberts, and Lauri D. Tiala, Towanda, Pa., assignors to Sylvania Electric Products Inc., a corporation of Delaware
Filed Dec. 27, 1966, Ser. No. 605,013
Int. Cl. B26f 3/02; B65h 35/10
U.S. Cl. 225—99     6 Claims

ABSTRACT OF THE DISCLOSURE

An apparatus for removing articles from an elongated web is disclosed wherein the outlines of the articles are delineated by tear lines in the web and the web having openings therethrough at the edges of each article transverse to the edge of the web. The apparatus includes in combination a conveying means for advancing the web along in a direction of the length of the web; a separating blade which diverges outwardly from the tip and disposed in the path of the advancing web; and a threading means for inserting the tip of the blade into openings in the advancing web whereby the articles pass on one side of the blade and the intervening sections of the web pass on the other side of the blade, and the separating blade being adapted to cause tearing of the web along the tear lines as the web is advanced past the blade so as to remove each article in succession from the web.

---

Figure 1:
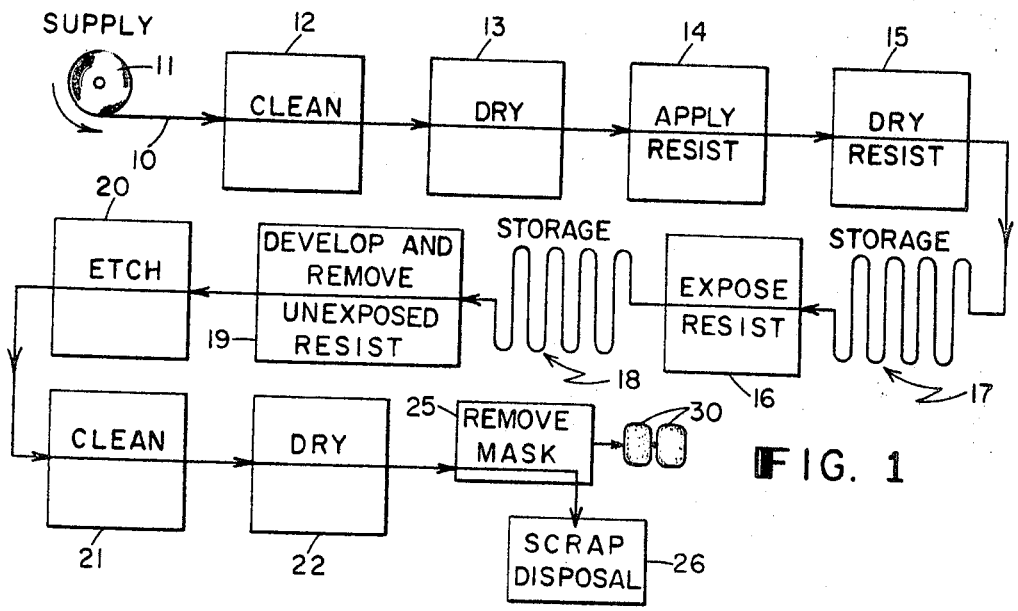

This invention relates to the manufacture of articles from a continuous web of material. More particularly, it is concerned with apparatus for removing articles fabricated in an elongated web from the web.

The process of fabricating articles from thin metal webs by photo-etching techniques is well known. The web is subjected to a succession of operations including coating of one or both sides with a light-sensitive material, photo-printing a pattern or design on the light-sensitive coating, developing the printed coating to expose the areas of the metal covered by unexposed portions of the coating, etching the exposed areas of the web to produce articles according to the pattern or design, and subsequently removing the articles from the material of the web.

Aperture masks for color television picture tubes are among the precision thin metal articles manufactured by this process. An aperture mask is a thin sheet of steel of fairly precise outline dimensions having an array of more than 400,000 small apertures of precise dimensions and spacing. The apertures are produced by coating, printing, and etching both sides of a metal web according to the foregoing photo-etching process. Simultaneously with the formation of the apertures, the outline of the mask is delineated by etching tear lines in the web which continue to support the mask in the web but permit subsequent removal of the mask from the web.

Aperture masks are fabricated from an elongated web of metal in automatic or semiautomatic equipment. Each section of the web passes through each processing station of the equipment in succession. As the web containing a completed mask passes from the last station of the processing equipment, the web is cut transverse to its length in the intervening section between each two masks. Then, each mask is torn by hand from its surrounding piece of web.

Although the process is otherwise highly automatic and efficient, the steps of cutting the web and tearing out the masks each require one or more operators. During these steps the masks are subjected to possible damage by tearing, creasing, or otherwise distorting the metal. Care must be exercised so that additional cleaning operations will not be necessary in order to remove grease and other contaminating materials to which the masks may be exposed during handling. In addition, quantities of individual pieces of scrap constituting the unused portion of the web must be removed from the site of the tearing step.

It is an object of the present invention, therefore, to provide an improved apparatus for removing articles from a web.

It is a more specific object of the invention to provide apparatus for automatically tearing from an elongated web articles having their outlines delineated by tear lines in the web.

Briefly, in accordance with the objects of the invention, the outlines of articles in the elongated web are delineated by tear lines in the web. Openings through the web are formed at the leading and trailing edges of each article transverse to the length of the web. The apparatus according to the invention includes a conveying means for advancing the web along a path in the direction of the length of the web. A separating blade which diverges outwardly from a tip is disposed in the path of the advancing web. The tip of the blade is inserted into each of the openings in the advancing web by a threading means so that the articles pass on one side of the blade and the intervening sections of the web between the articles pass on the other side of the blade. The separating blade is adapted to cause tearing of the web along the tear lines as the web is advanced past the blade, thus removing each article in succession from the web.

It is a feature of the invention to employ a separating blade which is of generally uniform thickness and has generally flat opposed major surfaces. A first tearing portion of the blade diverges gradually from the tip to a maximum width which is less than the maximum transverse dimension of an article. Contiguous the first tearing portion is a relieved portion having a width less than the maximum width of the first tearing portion. Contiguous the relieved portion is a second tearing portion of the blade which diverges more steeply than the first tearing portion and widens to a width which is greater than the maximum transverse dimension of an article. During movement of the web past the blade, the first tearing portion of the blade causes tearing of the tear lines beyond the openings in the direction generally transverse to the length of the web to partially separate an article from the remainder of the web. The second tearing portion of the blade causes tearing along the remainder of the tear lines in the direction generally along the length of the web to complete separating of an article from the remainder of the web.

Figure 2:
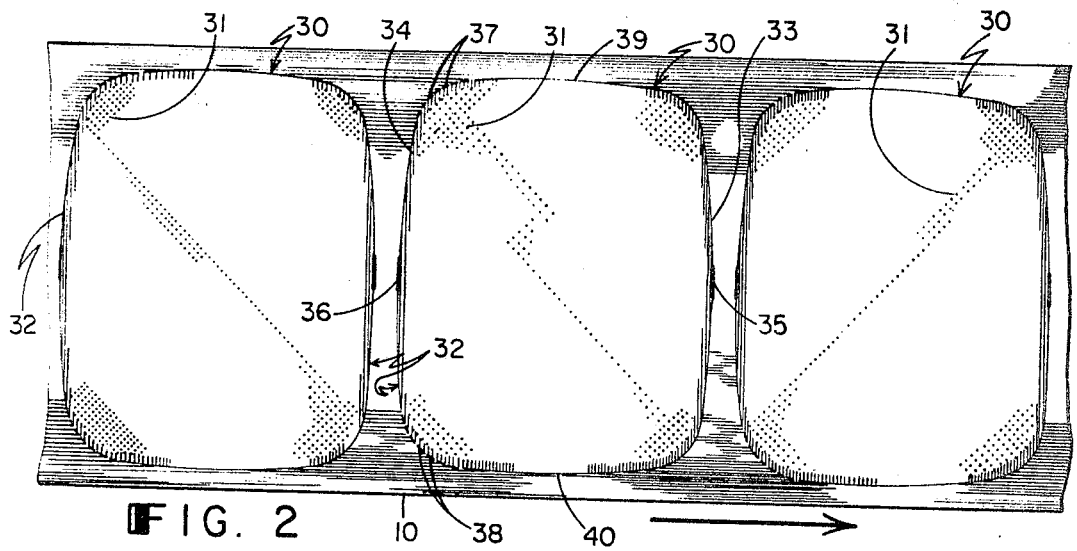
Figure 5:
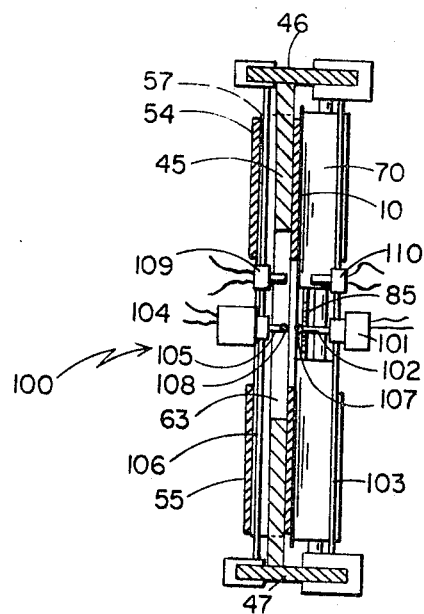

Additional objects, features, and advantages of apparatus according to the invention will be apparent from the following detailed discussion and the accompanying drawings wherein:

FIG. 1 is a schematic representation of equipment for fabricating articles, specifically color television aperture masks, from a continous web of sheet metal by the use of photo-etching techniques, FIG. 2 is a view of a portion of an elongated web showing masks which have been fabricated therein, FIG. 3 is a front elevational view of apparatus according to the invention for removing aperture masks from the continuous web in which they have been fabricated, FIG. 4 is a cross-sectional plan view of apparatus according to the invention taken generally along line 4—4 of FIG. 3, and FIG. 5 is an elevational view in cross-section taken generally along line 5—5 of FIG. 2 and showing the apparatus at a different stage of operation.

FIG. 1 is a schematic representation of equipment for fabricating color television aperture masks including apparatus according to the invention for separating the completed masks from the web. A web of material 10 is fed from a supply reel 11 into the equipment with the plane of the web vertical. In manufacturing masks for 25" color picture tubes a web of 6 mils thick cold-rolled steel about 20½" wide may be used. The web passes through apparatus 12 for cleaning the metal and through a drying apparatus 13. Then, both sides of the web are coated with a suitable photosensitive resistant material in a coating apparatus 14. The photosensitive resistant coating is baked and hardened in an oven 15.

Next, the coated web is treated in photographic printing apparatus 16. In this apparatus negative patterns of the masks are aligned on opposite sides of the web, and the coating on the web is exposed through the patterns by means of suitable light sources. Since movement of the web cannot be continued during this operation, portions of the web are stored in accumulators 17 and 18 before and after being exposed to light.

The exposed web is fed into developing and baking apparatus 19. The coating of resistant material is treated with a developing solution to remove the portions of the coating which were shielded by opaque portions of the negative patterns and thus not exposed to light. Heating further hardens the remaining adherent portions of the coating, which were exposed to light, to make them more resistant to the etching solution. The web is then treated in an etching apparatus 20 with an etching solution which dissolves the material of the web but not the remaining resistant material. Thus, the uncoated regions of the web, not protected by the remaining resistant coating, are attacked by the etching solution forming masks as determined by the negative patterns.

After the etching treatment, the web passes into cleaning apparatus 21 where it is treated to insure that the etching action has stopped, to remove the remaining resistant material, and to obtain the desired surface finish on the metal. After being dried in an oven 22, the web is fed into the automatic separating apparatus 25 according to the invention which removes the completed aperture masks from the web and feeds the remainder of the web into scrap disposal apparatus 26.

A portion of the elongated web 10 showing the masks 30 fabricated therein prior to their removal is illustrated in FIG. 2. Each mask 30 contains an array of apertures 31. The apertures were formed during the chemical etching operation by etching action from both sides of the web. Tear lines 32 delineating the outline of each mask were also formed during the etching operation by etching the lines from only one side of the web. At the central portion of the leading and trailing transverse edges 33 and 34, respectively, of each mask the web was etched from both sides to produce openings or slots 35 and 36 through the web. Portions of the web at the upper and lower corners of the trailing edges were also etched from both sides to form a series of slots or perforations 37 and 38 in the web. The edges of the masks may be delineated by any combination of partially etched and perforated lines as desired to provide a weakened pattern of tear lines in the web.

The web as shown in FIG. 2 is fed from the final drying oven 22 into the mask separating apparatus 25 according to the invention as illustrated in FIGS. 3, 4, and 5. The apparatus includes a vertical support or backing plate 45. Horizontal support members 46 and 47 are fixed to the upper and lower edges, respectively, of the backing plate and extend beyond the vertical edges of the plate. The support members 46 and 47 and backing plate 45 are attached to stanchions 48 and 49 by brackets 50 and 51, and 52 and 53, respectively.

A pair of conveying belts 54 and 55 are arranged to move along the front surface of the backing plate 45 from the forward end to the rearward end of the apparatus. The belts are engaged by rollers 56 and 57 which are mounted between the upper and lower support members 46 and 47. The roller 57 at the rearward end of the apparatus is driven in a counter-clockwise direction as viewed in FIG. 4 by a drive motor and gear assembly 58 through a belt 59, a vertical shaft 60, a slip clutch 61, and another belt 62. The upper and lower conveying belts 54 and 55 are separated by a vertical distance so as not to obscure a cutout 63 in the forward section of the backing plate 45 for reasons to be explained hereinbelow.

Idler rollers 64 and 65 are mounted between the horizontal support members so as to be urged toward the rollers 56 and 57 and the conveying belts 54 and 55. Several idler rollers 70, 71, 72, 73, 74, 75, and 76 are mounted along the length of the support members 46 and 47 so as to be urged toward the backing plate. Each of these rollers is divided into an upper and a lower section for reasons to be explained. A driven roller 77 and an idler roller 78 are mounted between the support members 46 and 47 at the rearward end of the apparatus. The rollers are spaced from the conveying belts. The driven roller 77 is rotated in a counter-clockwise direction as seen in FIG. 4 via the vertical shaft 60, a slip clutch 79, and a driving belt 80. The idler roller 78 is urged toward the driven roller 77.

A generally flat separating blade 85 is attached to the backing plate 45 by upper and lower supporting blocks 86 and 87 so as to be in a plane parallel to the plane of the backing plate 45 and conveying belts 54 and 55 while spaced at a slight distance from the plate, thus permitting the belts to pass between the plate and the blade. Guide rollers 88 and 89 mounted on the shafts of idler rollers 71 and 74, respectively, assist in maintaining proper spacing between the blade and belts along the entire length of the blade. The blade is a metal plate having opposed generally flat major surfaces. For use in the manufacture of aperture masks for television picture tubes the blade may be approximately ¼" thick and be spaced about ⅛" from the conveying belts. The edges of the blade are gently rounded, and the back surface of the plate of the blade may be relieved by milling except at the edge regions.

The blade comprises a tip portion 90, a first tearing portion 91, a relieved portion 92, and a second tearing portion 93, and is symmetrical about its longitudinal axis. The first tearing portion 91 diverges gradually from the tip portion 90 to a maximum width which is less than the maximum transverse dimension between the longitudinal edges 39 and 40 of each of the masks. The length of the first tearing portion 91 from the tip 90 to the maximum width 94 is greater than the longitudinal dimension between the transverse edges 33 and 34 of each of the masks. The width of the relieved portion 92 of the blade is less than the maximum width of the first tearing portion. The relieved portion extends along the length of the blade for a relatively short distance. The second tearing portion 93 diverges steeply from the relieved portion to a maximum width which is greater than the maximum transverse dimension of the mask.

A threading mechanism 100 for deflecting the portion of the web adjacent the tip portion of the blade toward or away from the backing plate 45 so as to cause the tip to become inserted in the slots is located in the region of the cutout 63 in the forward section of the backing plate 45 adjacent the tip portion 90 of the separating blade. A first solenoid 101 having a first armature 102 is mounted on a support rod 103 in front of the backing plate 45. A second solenoid 104 having a second armature 105 is mounted on a support rod 106 behind the backing plate 45. Rollers 107 and 108 are mounted on the ends of the armatures 102 and 105, respectively. The solenoids are actuated in an appropriate manner to be explained hereinbelow by signals from a photocell 109 mounted on the support rod 106. A light source 110 is mounted on the support rod 103 opposite the photocell and arranged to direct a beam of light onto the photocell.

The apparatus according to the invention operates in the following manner to separate each mask 30 in succession from the remainder of the web 10. The web passes between the moving conveying belts 54 and 55 and the idler roller 64 and is carried along by conveying belts 54 and 55. The idler rollers 70, 71, 72, 73, 74, 75, and 76 tend to urge the longitudinal edge portions of the web against the belts whereby the belts advance the web along a path generally parallel to the backing plate 45.

As the web advances along the length of the apparatus, the threading mechanism 100 causes the tip portion 90 of the separating blade 85 to become inserted in the slots 35 and 36 at the leading 33 and trailing 34 transverse edges of each mask. The light source 110 and photocell 109 are positioned so that as the slot 35 in the leading edge of a mask approaches the tip portion 90 of the separating blade, the region of the mask occupied by the array of apertures 31 begins to pass between the light source 110 and the photocell 109 and light impinges on the photocell. Signals from the photocell 109 actuate the solenoids 101 and 104 causing the back armature 105 to be retracted and the front armature 102 to be advanced toward the web as shown in FIG. 5. Under these conditions the front armature 102 is operative to urge the portion of the web adjacent the tip portion of the blade away from the plane of the blade toward the plane of the plate 45 as the slot 35 in the leading edge of the mask advances past the tip of the blade. The photocell 109 continues to produce a signal holding the solenoid armatures in these positions so long as the aperture region of a mask is passing between the light source and photocell.

As the trailing edge 34 of a mask approaches the tip portion 90 of the blade, the opaque peripheral region of the mask and the intervening section of the web between masks passes between the light source 110 and photocell 109 cutting off the light impinging on the photocell. The resulting signals, or lack thereof, from the photocell to the solenoids causes the front armature 102 to retract and the back armature 105 to advance toward the web as shown in FIG. 4. Under these conditions the back armature 105 is operative to urge the portion of the web adjacent the tip portion of the blade away from the plane of the plate 45 to beyond the front surface of the blade as the slot 36 in the trailing edge of the mask advances past the tip of the blade.

Thus it can be seen that as the web is advanced along its path by the conveying belts 54 and 55, the central portion of the web immediately in advance of the tip portion 90 of the blade is deflected to one side or the other of the blade. The action of the threading mechanism as described causes the tip of the blade to be inserted in the slots in the web so that the masks pass between the blade and the conveying belts 54 and 55 and the intervening sections of the web between masks pass to the front of the blade. Although, as described, the solenoids are triggered by opaque and light transmitting regions of the mask itself passing appropriately located sensing devices, various other arrangements utilizing indicia in the web associated with each mask may be employed to cause triggering of the solenoids to their operative conditions at the proper times.

When the tip of the blade enters the slot 35 at the leading edge of a mask continued advancement of the web carries the mask along the back side of the blade and the intervening section of the web contiguous the leading edge along the front side of the blade. The rollers 70, 71, 72, 73, 74, 75, and 76 hold the web 10 against the moving conveying belts 54 and 55 thereby causing the web to advance along the path. In addition, the idler rollers tend to hold the mask and the upper and lower longitudinal edge portions of the remainder of the web in a vertical plane.

As the slot in the leading edge of the mask advances, the increasing width of the first tearing portion 91 of the blade causes the material of the web at the extremities of the slot to tear in order to accommodate the inserted blade. Because of the manner in which the mask is held generally flat against the conveying belts 54 and 55 and the manner in which the intervening section of the web bridges the blade while the longitudinal edges of the web are held in the plane of the mask, and because of the thickness of the blade and the gently rounded contour of its tearing edges, the blade acts as a moving wedge between the mask and the intervening section of the web thereby producing a strain in the material of the web which causes the web to tear along the weakened tear lines. Since the tearing edges 91a in the first tearing portion 91 of the blade lie at a small angle to the longitudinal axis of the blade, they extend in a generally normal direction to the transverse edges 33 and 34 of the mask.

The tearing action continues as the web advances until the slot 35 in the leading edge of the mask has been enlarged to the extent determined by the maximum width 94 of the first tearing portion 91 of the blade which is less than the maximum transverse dimension of a mask. Because of the wedge action of the blade as previously described, the tear lines defining the leading edge of the mask are torn to adjacent the corners of the mask. By the time the leading edge of the mask has reached the point of maximum width of the first tearing portion 91 of the blade, the tip portion 90 has entered the slot 36 at the trailing edge of the mask and the material of the web is being torn along the weakened tear lines 32 defining the trailing edge of the mask.

As the web continues to advance, the unbroken tear lines move past the relieved portion 92 of the blade, where no tearing action takes place, toward the second tearing portion 93. The web is carried along the path beyond the last idler roller 76 by the driven roller 77 and its idler roller 78 acting continuously on the upper and lower longitudinal edge regions of the web. As the mask advances, it passes between the blade supporting blocks 86 and 87 and is gripped between the conveying belts 54 and 55 and the final idler roller 65 at the rearward end of the apparatus.

The tearing edges 93a of the second tearing portion of the blade lie at a large angle to the longitudinal axis of the blade and thus at a large angle to the tear lines 32 defining the longitudinal edges 39 and 40 of the mask. The second tearing portion 93 of the blade acts as a wedge moving relatively between the mask and the longitudinal edge regions of the remainder of the web thereby causing the material of the web to tear along the tear lines defining the longitudinal edges 39 and 40 of the mask. Since the second tearing portion 93 increases in width to a dimension greater than the maximum transverse dimension of the mask, the tear lines become completely torn separating the mask from the remainder of the web.

The relieved portion 92 of the separating blade spaces the second tearing edges 93a which cause tearing along the longitudinal edges of the mask from the first tearing edges 91a which cause tearing along the transverse edges. Because of this spacing the trailing transverse edge is torn from the web before the longitudinal edges are completely torn from the web. It has been found that this configuration of the blade and the resulting tearing action permits the mask to tear completely from the web without creating undesirable stresses which might cause tearing along other than the weakened tear lines delineating the outline of the mask. Furthermore, it has been found that if there is no intervening relieved portion of lesser width than the maximum width of the first tearing portion between the two tearing portions, uncontrollable tearing of the material frequently occurs at the transition region between the two sets of tearing edges.

As the tear lines defining the longitudinal edges 39 and 40 of the mask are being torn by the second tearing portion 93 of the blade, the mask remains against the conveying belts 54 and 55 while the remainder of the web is carried in front of the plane of the blade by the rollers 77 and 78. When the trailing edge corners of the mask reach the tearing edges 93a, the leading portion of the mask has reached the final roller 65, and thus the mask is supported and advanced by the roller 65, and the conveying belts 54 and 55. When the web has advanced to this position there is no further need for the mask to be supported in any way by the web. Therefore, the tear lines at the trailing corners may be a series of slots 37 and 38, as shown, to permit the final rupture between the mask and the remainder of the web to take place very easily and quickly.

As the mask is separated completely from the remainder of the web, it passes between the final roller 65 and the conveying belts 54 and 55 into a suitable receiving means (not shown). The remainder of the web passes between rollers 77 and 78 and into a suitable scrap disposal means 26 indicated generally in FIG. 1.

Each mask in succession is similarly removed from the web as the web continuously advances through the separating apparatus. Each mask is diverted to pass between the blade and the conveying belts 54 and 55 while the intervening sections of the web pass on the front side of the blade. The first tearing portion 91 tears the advancing web along the tear lines generally defining the leading and trailing transverse edges of the masks to partially separate the mask from the remainder of the web, and the second tearing portion 93 tears the web along the tear lines generally defining the longitudinal edges of the mask to complete separating of the mask from the web.

The operation is automatic. Each mask receives uniform processing and is not exposed to contamination. The masks remain flat and tearing stresses are applied equally to every mask in a manner controlled by the apparatus. Scrap is continuously removed from the apparatus and from the vicinity of the completed masks. The apparatus may be employed as an element in continuous flow automatic equipment as shown in FIG. 1, thus providing various advantages inherent in automatic continuous operation to the final stage in the fabrication of masks.

While there has been shown and described what is considered a preferred embodiment of the present invention, it will be obvious to those skilled in the art that various changes and modifications may be made therein without departing from the invention as defined in the appended claims.

What is claimed is:

1. Apparatus for removing articles from an elongated web, the outlines of the articles being delineated by tear lines in the web and the web having openings therethrough at the edges of each article transverse to the length of the web, said apparatus including in combination:
    conveying means for advancing the web along a path in the direction of the length of the web;
    a separating blade having a general uniform thickness and a generally flat opposed major surface and diverging outwardly from a tip to a maximum width which is less than the maximum transverse dimension of said articles and disposed in the path of the advancing web; and
    threading means for inserting the tip of the blade into the openings in the advancing web whereby the articles pass on one side of the blade and the intervening sections of the web pass on the other side of the blade; said separating blade being adapted to cause tearing of the web along the tear lines as the web is advanced past the blade, so as to remove each article in succession from the web.

2. Apparatus for removing from an elongated web articles spaced apart along the length of the web by intervening sections of the web, said articles having their outlines delineated by weakened tear lines in the web and the web having openings therethrough at the edges of each article transverse to the length of the web, said apparatus including in combination
    a separating blade having a tip portion, a first tearing portion diverging gradually from the tip portion to a maximum width less than the maximum transverse dimension of an article, a relieved portion having a width less than said maximum width, and a second tearing portion diverging more steeply than said first tearing portion from the relieved portion to a maximum width greater than the maximum transverse dimension of an article,
    conveying means for advancing the web in a path along the direction of the length of the web, and
    threading means for inserting the tip portion of the blade into the openings in the advancing web whereby further advancing of the web by the conveying means causes articles to pass on one side of the blade and the intervening sections of the web to pass on the other side of the blade, the first tearing portion of the blade causing tearing along the tear lines beyond the openings in the direction generally transverse to the length of the web to partially separate articles from the remainder of the web, and the second tearing portion of the blade causing tearing along the remainder of the tear lines in the direction generally along the length of the web to complete separating of articles from the remainder of the web.

3. Apparatus for manufacturing articles from an elongated web of sheet material including in combination
    means for delineating the outlines of articles in the web by producing weakened tear lines in the material of the web and for forming openings through the web at the edges of each article transverse to the length of the web;
    a separating blade having opposed generally flat major surfaces and including a tip portion, a first tearing portion, a relieved portion, and a second tearing portion;
    the first tearing portion diverging from the tip portion to a maximum width less than the maximum transverse dimension of an article, the diverging edges of the first tearing portion lying at a small angle to the longitudinal axis of the blade, and the length of the first tearing portion being greater than the maximum longitudinal dimension of an article;
    the width of the relieved portion being less than the maximum width of the first tearing portion;
    the second tearing portion diverging from the relieved portion to a width greater than the maximum transverse dimension of an article, the diverging edges of the second tearing portion lying at a large angle to the longitudinal axis of the blade;
    conveying means for advancing the web in a path along the direction of the length of the web in a plane adjacent and parallel to the surfaces of the blade; and
    threading means for inserting the tip portion of the blade into the openings in the web as the openings advance past the tip portion of the blade whereby the articles pass on one side of the blade and the intervening sections pass on one side of the blade and the intervening sections of the web pass on the opposite side of the blade.

4. Apparatus for manufacturing articles from an elongated web of sheet material including in combination
    means for delinating the outlines of articles in the web by producing weakened tear lines in the material of the web and for forming openings through the web at the edges of each article transverse to the length of the web;
    supporting structure including a generally flat plate;
    a separating blade having opposed generally flat major surfaces and including a tip portion, a first tearing portion, a relieved portion, and a second tearing portion;

the first tearing portion diverging from the tip portion to a maximum width less than the maximum transverse dimension of an article, the diverging edges of the first tearing portion lying at a small angle to the longitudinal axis of the blade, and the length of the first tearing portion being greater than the maximum longitudinal dimension of an article;

the width of the relieved portion being less than the maximum width of the first tearing portion;

the second tearing portion diverging from the relieved portion to a width greater than the maximum transverse dimension of an article, the diverging edges of the second tearing portion lying at a large angle to the longitudinal axis of the blade;

means supporting the separating blade closely adjacent and spaced from the plate with the blade generally parallel to the plate, a forward portion of the plate extending beyond the tip portion of the blade and a rearward portion of the plate extending beyond the second tearing portion of the blade;

conveying belts arranged to pass between the blade and the plate;

means for moving the conveying belts between the blade and the plate along the length of the plate and blade in the direction from the tip portion of the blade toward the second tearing portion of the blade;

an idler roller located adjacent the conveying belts at the forward portion of the plate and adapted to urge the web passing between the idler roller and the conveying belts against the conveying belts whereby the web is advanced along the length of the plate toward the tip portion of the blade;

threading means adapted to deflect the portion of the web adjacent the tip portion of the blade toward or away from the plate to cause the tip portion of the blade to become inserted in the openings in the web as the web is advanced along the length of the plate with the articles passing between the conveying belts and the blade and the intervening sections of the web between the articles passing on the opposite side of the blade;

an idler roller located adjacent the conveying belts at the rearward portion of the plate and adapted to urge each article passing between the blade and the conveying belts to pass between the conveying belts and the roller whereby the article is advanced past the blade; and means located at the rearward portion of the plate and spaced at a distance from the conveying belts and adapted to engage the longitudinal edge portions of the web and advance the web.

5. Apparatus for manufacturing articles from an elongated web of sheet material in accordance with claim 4 and including
a plurality of idler rollers arranged along the length of the plate from adjacent the tip portion to adjacent the second tearing portion of the blade and adapted to urge the longitudinal edge portions of the web against the conveying belts.

6. Apparatus for manufacturing articles from an elongated web of sheet material in accordance with claim 5 wherein said threading means includes
sensing means for sensing indicia in the web associated with each article and producing signals in response thereto,
a first deflecting means located adjacent the tip portion of the blade at the forward portion of the plate and adapted when in an operative condition in response to signals from said sensing means to urge the portion of the web adjacent the tip portion of the blade away from the plane of the blade toward the plane of the plate, and
a second deflecting means located adjacent the tip portion of the blade at the forward portion of the plate and adapted when in an operative condition in response to signals from said sensing means to urge the portion of the web adjacent the tip portion of the blade away from the plane of the plate to beyond the surface of the blade opposite the conveying belts,
said sensing means being located with respect to the first and second deflecting means so that signals produced by the sensing means in response to the indicia in the advancing web cause the first deflecting means to be in the operative condition as the opening in the leading edge of each article advances past the tip portion of the blade and cause the second deflecting means to be in the operative condition as the opening in the trailing edge of each article advances past the tip portion of the blade.

References Cited

UNITED STATES PATENTS

| 2,880,799 | 4/1959 | Whitman | 225—93 |
| 3,204,841 | 9/1965 | Guyer | 225—99 X |

JAMES M. MEISTER, *Primary Examiner.*